United States Patent
Weller

[15] 3,672,295
[45] June 27, 1972

[54] STRAPPING MACHINE
[72] Inventor: Frank C. Weller, Chicago, Ill.
[73] Assignee: Interlake, Inc., Chicago, Ill.
[22] Filed: Aug. 13, 1970
[21] Appl. No.: 63,479

[52] U.S. Cl.....................................100/4, 100/12, 100/30
[51] Int. Cl.............................................................B65b 13/16
[58] Field of Search.......................100/4, 12, 30, 29, 32, 33

[56] References Cited

UNITED STATES PATENTS

| | | | |
|---|---|---|---|
| 3,139,813 | 7/1964 | Hall et al. | 100/4 |
| 3,120,171 | 2/1964 | Hall et al. | 100/30 X |
| 3,215,064 | 11/1965 | Koehler | 100/4 |
| 3,232,217 | 2/1966 | Harmon et al. | 100/4 |
| 3,447,447 | 6/1969 | Rutty | 100/4 |
| 3,450,028 | 6/1969 | Goland et al. | 100/30 |

Primary Examiner—Billy J. Wilhite
Attorney—Prangley, Clayton, Mullin, Dithmar & Vogel

[57] ABSTRACT

A short-seat strapping machine has a strapping head including pairs of gripping jaws, sealing and shearing jaws, and gathering jaws, all aligned longitudinally of the strap, the machine having a loop-tensioning configuration wherein the gathering jaws are open and the sealing jaws are partially closed to take the place of the gathering jaws, thereby accommodating tensioning of the strap in a loop about an object wherein the portion thereof facing the head has a dimension longitudinally of the strap less than the distance between the outer ends of the gripping jaws and gathering jaws, but not less than the distance between the outer ends of the gripping jaws and shearing jaws; the gathering jaw and sealing jaws are linked together for simultaneous actuation to the loop-tensioning configuration.

12 Claims, 14 Drawing Figures

PATENTED JUN 27 1972

INVENTOR
FRANK C. WELLER
BY
Prangley, Clayton, Mullin,
Dithmar & Vogel
ATTYS.

3,672,295

STRAPPING MACHINE

This invention relates to an improvement in a strapping machine of the type disclosed in U.S. Pat. No. 3,139,813 issued July 7, 1964, to Marchand B. Hall et al., the disclosure of which patent is incorporated herein by reference.

More particularly, this invention relates to an improved short-seat strapping machine for use in applying a strap around an object, wherein the portion of the object facing the machine has a relatively small dimension in a direction longitudinally of the applied strap, for example, tubular objects and annular coils of material.

It is an important object of this invention to provide a strapping machine for applying a strap around an object wherein the portion of the object facing the machine has a relatively small dimension in a direction longitudinally of the applied strap, the strapping machine comprising a strap gripper for holding the strap encircled in a loop about the object with the leading end of the strap overlapping the supply portion of the strap, joint forming jaws disposed adjacent to the overlapped portions of the strap in general alignment with the gripper longitudinally of the strap, the outer ends of the joint forming jaws and the gripper respectively forming two abutments spaced apart a distance less than the relatively small dimension and cooperating to define a straight portion of the strap loop therebetween, and tensioning means for tensioning the loop of strap by withdrawing the supply portion thereof relative to the leading end thereof, the joint forming jaws having a first condition accommodating longitudinal movement of the supply portion of the strap by the tensioning means for tensioning the loop about the object and across the abutments, the joint forming jaws having a second condition for securing together the adjacent overlapping portions of the strap to provide a joint therebetween along the straight portion of the loop after tensioning thereof, the joint having a length less than the relatively small dimension of the facing portion of the object for securing the strap in a tensioned condition about the object.

It is another object of this invention to provide a strapping machine of the type set forth, which further includes strap gathering means disposed on the side of the joint forming jaws opposite the gripper and in longitudinal alignment therewith, the strap gathering means being movable between a closed position engaging the strap for limiting the longitudinal movement of the leading end thereof along a supply portion thereof and an open position out of engagement with the strap, the outer end of the gathering means forming an abutment spaced from the abutment on the gripper by a distance greater than the relatively small dimension, and means for moving the gathering means from the closed position to the open position thereof before operation of the tensioning means.

It is another object of this invention to provide a strapping machine of the type set forth, which further includes first drive means coupled to the gathering means and to the joint forming jaws for simultaneously moving the gathering means to the open position thereof and the joint forming jaws to the first condition thereof, and second drive means coupled to the joint forming jaws for moving the joint forming jaws to the second condition thereof after tensioning of the loop.

Another object of this invention is to provide a strapping machine of the type set forth wherein the joint forming jaws have a deactuated condition out of engagement with the strap, the second drive means being operative to move the joint forming jaws from the second condition thereof to the deactuated condition thereof after formation of the joint.

Still another object of this invention is to provide a strapping machine of the type set forth which includes a seal feed mechanism for feeding a seal into a joint forming region adjacent to the supply portion of the strap, the seal having a length longitudinally of the strap less than the relatively small dimension, the joint forming jaws in the second condition thereof securing the seal about the adjacent overlapping portion of the strap to provide a seal joint therebetween.

Further features of the invention pertain to the particular arrangement of the parts of the strapping machine whereby the above-outlined and additional operating features are attained.

The invention, both as to its organization and method of operation, together with further objects and advantages thereof, will best be understood by reference to the following specification taken in connection with the accompanying drawings, in which.

Figure 1:
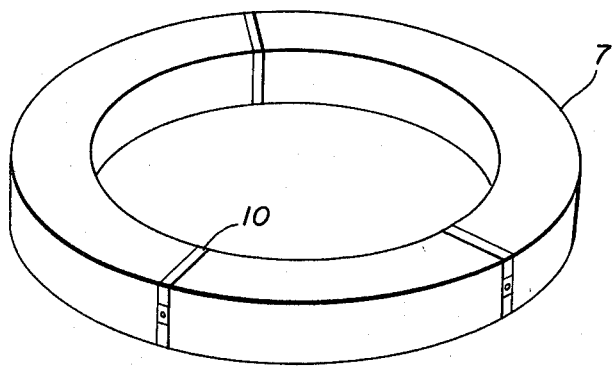
FIG. 1 is a perspective view of an annular coil of strap-like material in its bound condition after having had straps applied thereto by the strapping machine of the present invention.
Figure 2:
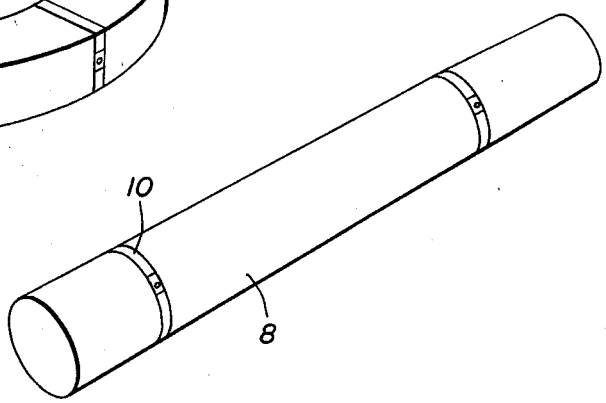
FIG. 2 is a perspective view of a generally cylindrical object shown in its bound condition after having had straps applied thereto by the strapping machine of the present invention.
Figure 3:
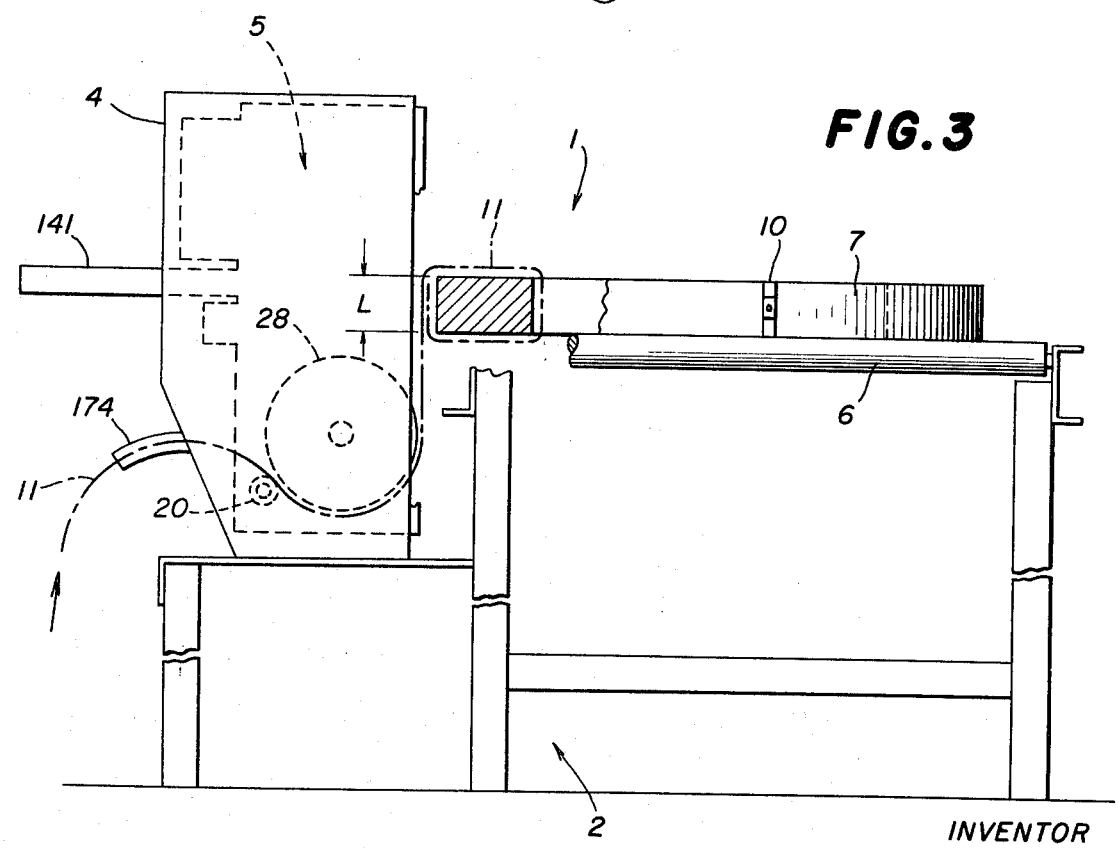
FIG. 3 is a front elevational view, partially broken away, of a strapping machine according to the present invention, illustrating an annular coil of the type shown in FIG. 1 in strapping position on the strapping machine.

Referring now to the drawings, and in particular to FIGS. 1 to 3 thereof, there is shown in FIG. 3 a strapping machine, generally designated by the numeral 1, constructed in accordance with and embodying the features of the present invention for applying straps 10 about objects, wherein the portion of the object facing the machine 1 has a relatively small dimension longitudinally of the applied strap. For example, the strapping machine 1 is particularly useful for applying straps 10 about annular coils 7 or generally cylindrical objects 8. The strapping machine 1 includes a framework 2 comprising a plurality of interconnected frame members supporting adjacent to one end thereof a housing 4 for a strapping head, generally designated by the numeral 5. Also mounted on the framework 2 is a plurality of rollers 6 arranged in a substantially horizontal plane for supporting thereon an object to be strapped, such as the annular coil 7. As illustrated in FIG. 3, the width "L" of the flat material comprising the coil 7 is relatively small as will be explained in greater detail hereinafter. The strapping machine 1 also includes a channel-shaped strap guide (not shown) for suitably guiding a loop of strap 10 around the package or object being strapped and insuring that the the end of this strap loop is properly fed over the object being strapped and up into the proper location within the strapping head 5.

Figure 4:
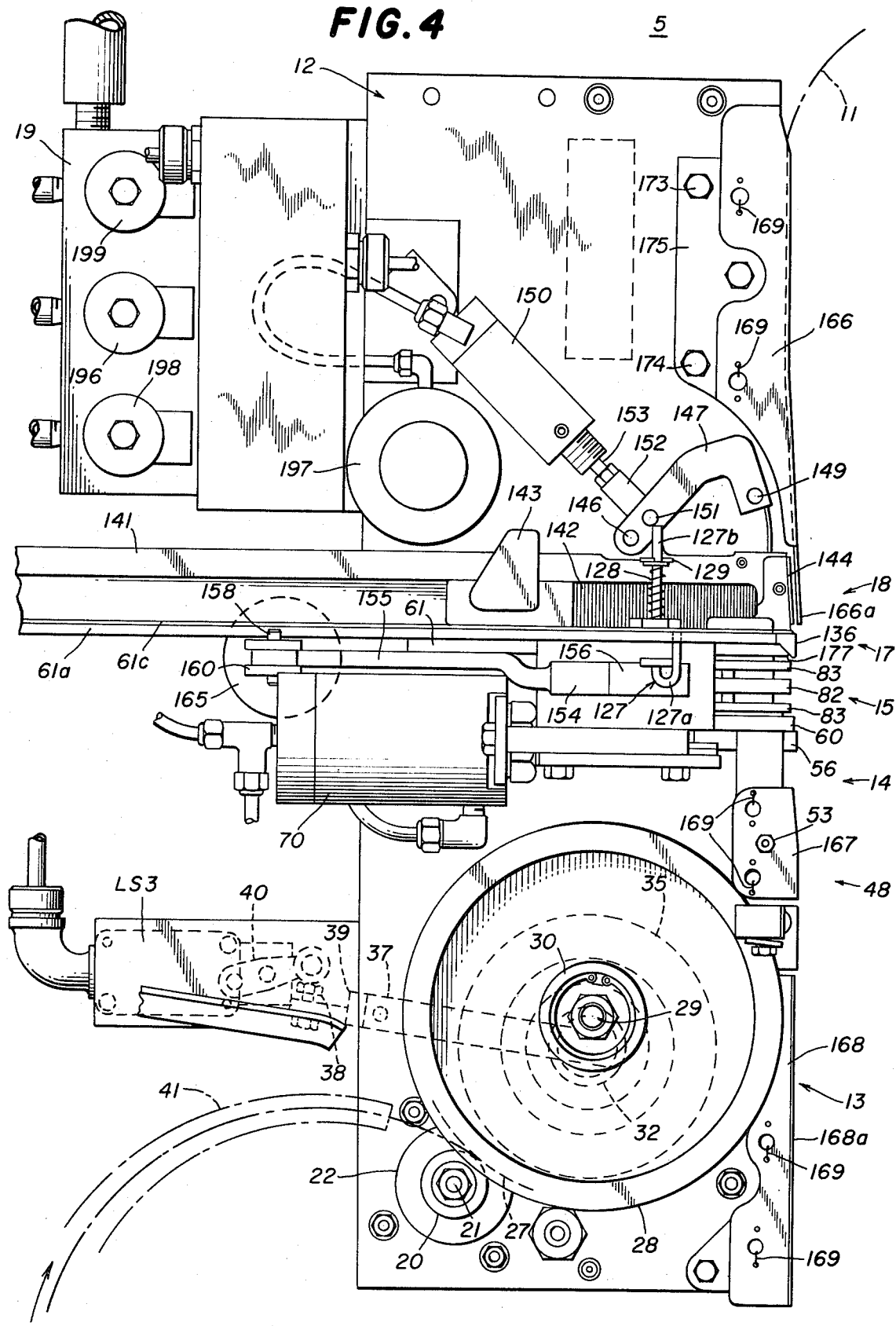
FIG. 4 is an enlarged front elevational view of the strapping head of a strapping machine constructed in accordance with and embodying the features of the present invention.
Figure 5:
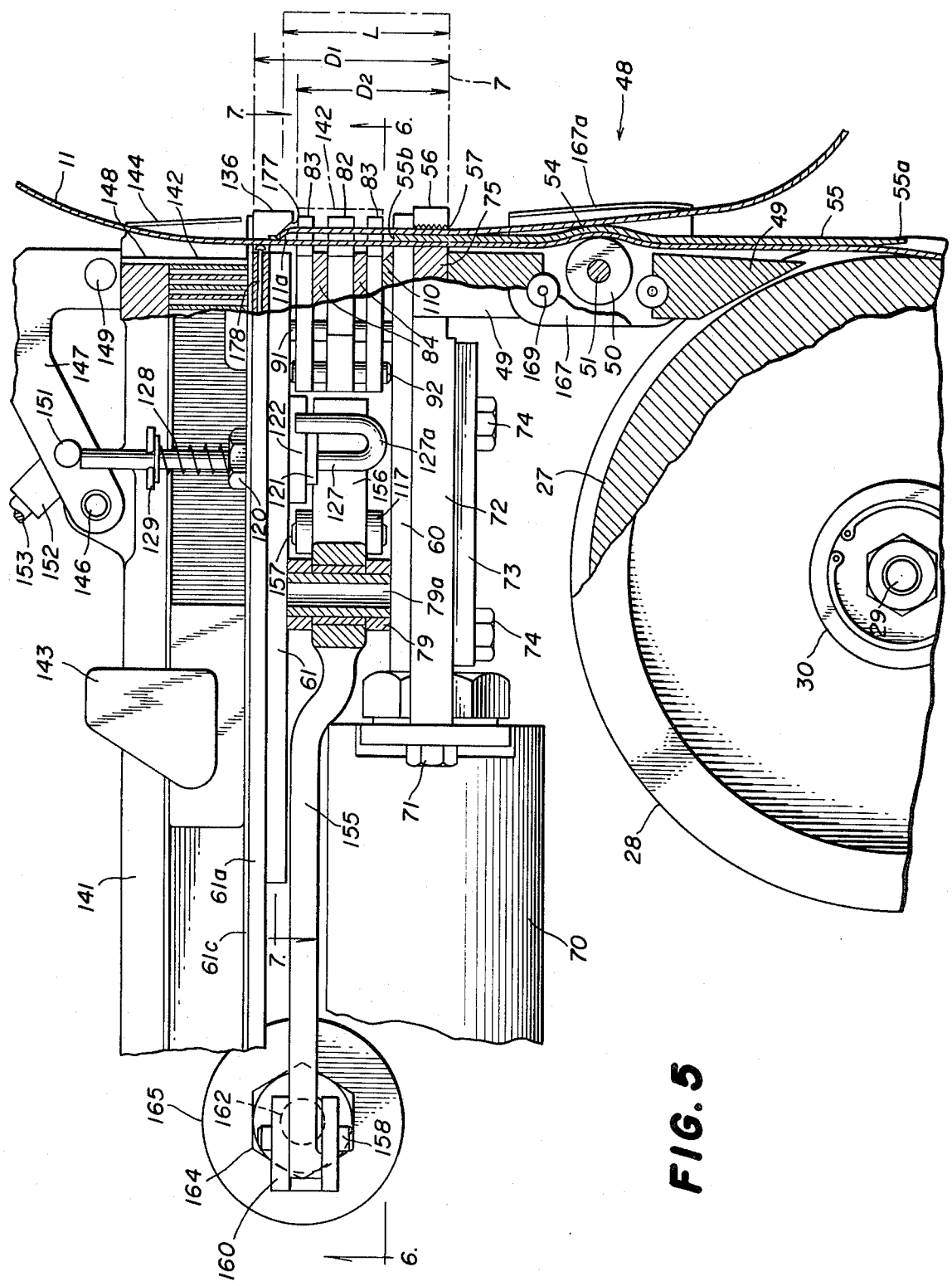
FIG. 5 is a further enlarged fragmentary view in partial section of a portion of the strapping head shown in FIG. 4, illustrating the arrangement of the various jaws on the strapping head.

Referring now also to FIGS. 4 and 5 of the drawings, the strapping head 5 includes a main support plate 12 on which are mounted all the components of the strapping machine head 5. The major operating portions of the head 5 consist of the strap feed, slack take-up and tensioning portion 13, a leading strap end gripping portion 14, a strap seal and shear portion 15, a strap gathering jaw portion 17 and a strap seal storing and feeding portion 18. In addition, there is a valve manifold 19 which houses a plurality of air valves for controlling the various operating portions of the head 5.

The strap feed, slack take-up and tensioning portion 13 is provided with a serrated rotary feed wheel or drum 20 secured to one end of a rotatably driven drive shaft 21 of an air motor 22, the air motor 22 being mounted on the rear side of the main support plate 12 and extending through a complementary opening therein to the front side thereof. For convenience, the side of the strapping head 5 illustrated in FIG. 4 of the drawings will hereinafter be referred to as the front side thereof, the opposite side of the strapping head being referred to as the rear side thereof. The rotary feed wheel 20 is so positioned that the teeth or serrations (not shown) along the periphery thereof are parallel and closely adjacent to an annular wall 27 on an idler drum or wheel 28. The idler wheel 28 is also disposed on the front side of the main support plate 12 and is mounted for rotation on a shaft 29 by means of a roller bearing 30. The idler wheel 28 is free to rotate on the bearing 30 relative to the shaft 29 except at the end of the tensioning operation, as will be hereinafter explained. The shaft 29 is secured at its inner or rear end to a flange (not shown) which is in turn secured to one end of a larger shaft 32, substantially parallel to but displaced from the shaft 29. The shaft 32 is journalled in bearings in a housing 35 secured to the rear side of the main support plate 12 by means of bolts 36. The rear end of the shaft 32 is secured to one end of a radially extending arm 37 which is coupled at the other end thereof to an actuator button 38 by means of a coupling member 39. The actuator button 38 is disposed in engagement with the outer end of an actuator arm 40 of an electric switch LS3, the rotational movement of the arm 37 about the axis of the shaft 32 serving to move the actuator arm 40 for opening and closing the switch LS3 for a purpose to be described in detail below. An input chute 41 is also provided for guiding the leading end 11a of a strap web 11 into the head 5 and between the annular wall 27 of the idler wheel 28 and the serrated outer surface of the feed wheel 20, a guide member (not shown) also being provided for guiding the strap web 11 around the wheel 28 in a counterclockwise direction as viewed in FIG. 4.

Above the level of the strap feed, slack take-up and tensioning portion 13 is the leading strap end gripping portion 14. The leading strap end gripping portion 14 is substantially the same as the corresponding gripping portion 14 disclosed in the aforementioned U.S. Pat. No. 3,138,813, and reference may be made thereto for a detailed disclosure of the gripping portion 14. With particular reference to FIG. 5, the gripping portion 14 comprises a pair of gripping jaws 56 mounted for pivotal movement between an open position and a closed position with respect to each other. Each of the gripping jaws 56 is provided with a serrated or toothed surface 57 which is positioned to engage the leading end 11a of the strap web 11 for clamping the leading end 11a against a backing plate 55, when the gripping jaws 56 are in the closed positions thereof. The backing plate 55 is secured to the main support plate 12 by suitable means, the leading or lower end of the plate 55a of the plate 55 serving as a guide for guiding the leading end 11a of the strap web 11 from the idler wheel 28 into the gripping portion 14.

There is also provided in a straightening region 48 a block 49 hollowed out to contain a straightening roller 50, the straightening roller 50 being mounted in the hollowed out portion of the block 49 on a shaft 51. The shaft 51 is mounted in the block 49 by means of a threaded nut 53 secured to one end of the shaft 51. Preferably, the shaft 51 may be moved transversely of the block 49 toward and away from a curved portion 54 of the backing plate 55. The leading end 11a of the strap web 11 is passed upwardly between the block 49 and the backing plate 55, and thence between the roller 50 and the curved portion 54, where the strap web 11 is deformed through a curved path for purposes of straightening the strap. The leading end 11a of the strap web 11 is then fed upwardly into the strap gripping portion 14. The transverse movability of the shaft 51 permits adjustment of the roller 50 to accommodate straps of different thickness.

The upper end 55b of the backing plate 55 is disposed a slight distance above the gripping jaws 56 and serves as a fixed shear blade attached to cooperate with a movable shear blade which will be described hereinafter. The inner ends of the gripping jaws 56 are connected by linkage (not shown) to the piston rod of an air-actuated piston 70 for effecting movement of the gripping jaws 56 between the open and closed positions thereof, all as is described in the aforementioned U.S. Pat. No. 3,139,813. The piston 70 is secured by screws or bolts 71 to a pair of supports 72 which are provided with a bottom cover plate 73 secured by means of screws 74 to a side plate 60. Disposed above the guide block 49 is a guide member 75 abutting against the inner surface of the backing plate 55, and provided with a groove therein for affording a clearance between the backing plate 55 and the guide member 75 shaped and dimensioned to accommodate free passage of the strap web 11 therethrough. Thus, even after the leading end 11a of the strap web 11 is securely clamped between the gripping jaws 56 against the outer surface of the backing plate 55, the supply portion of the strap web 11 is still freely movable along the inner surface of the backing plate 55 through the groove between the backing plate 55 and the guide member 75 during tensioning of the strap web 11, as will be described below.

Figure 6:
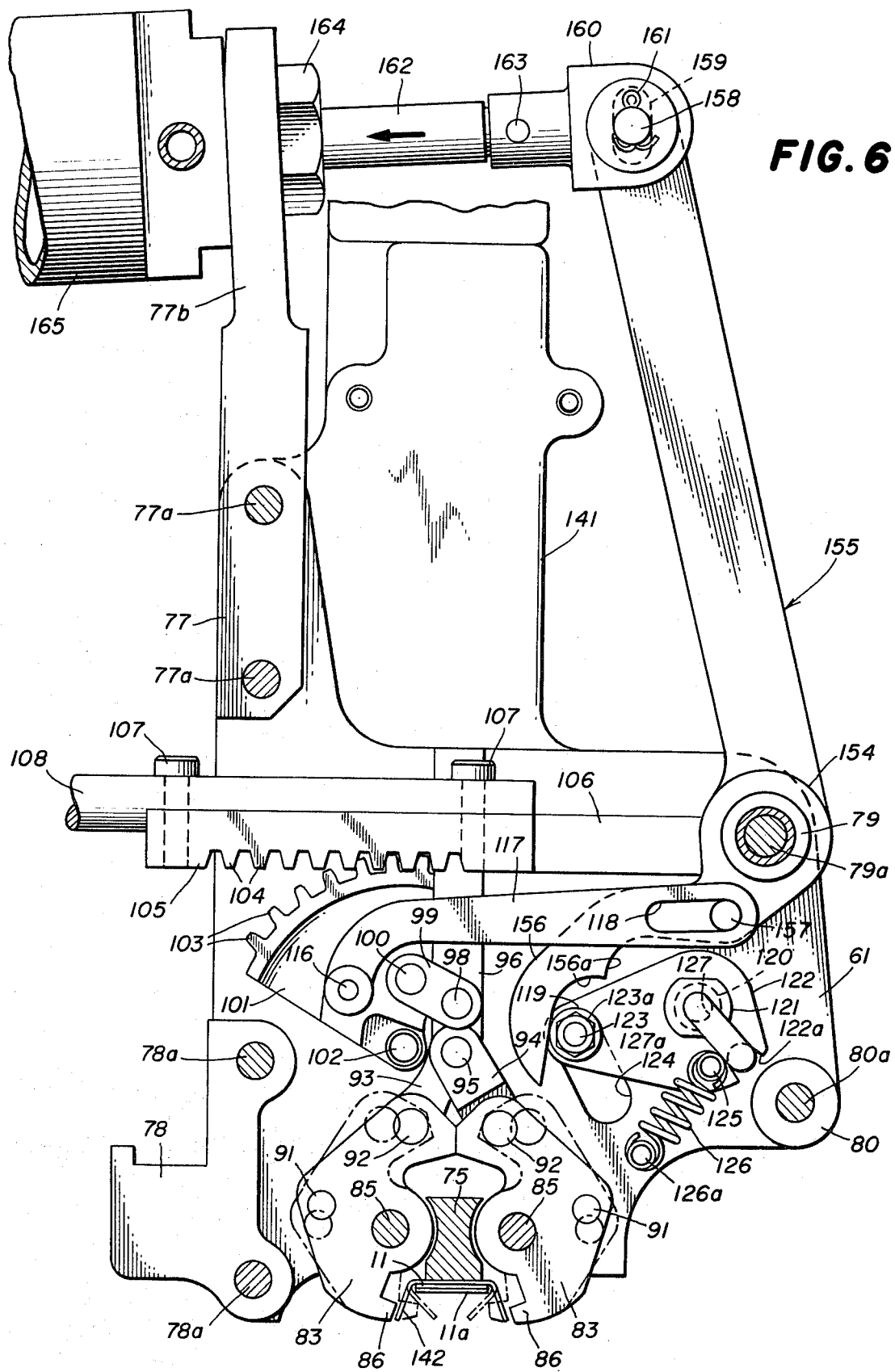
FIG. 6 is a further enlarged view in horizontal section of a strapping head constructed in accordance with this invention taken along the line 6—6 in FIG. 5 and rotated 90° clockwise, and illustrating the linkage for controlling the operation of the gathering jaws and sealing jaws.
Figure 8:
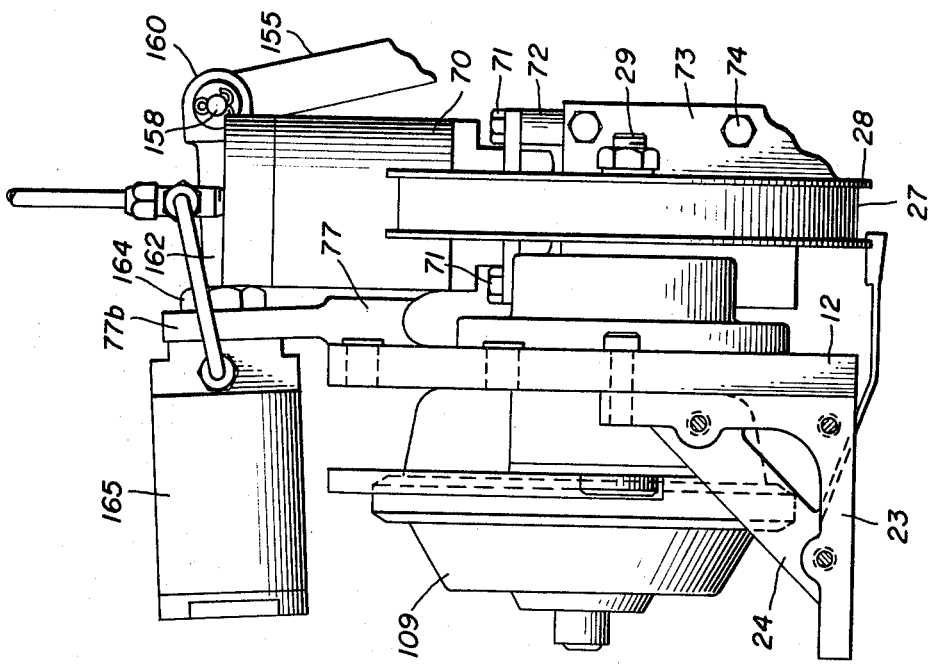
FIG. 8 is a fragmentary bottom plan view of the strapping head illustrated in FIG. 4, with the air motor and feed wheel removed to more clearly show the structure.

Referring now also to FIG. 6 of the drawings, immediately above the gripping portion 14 of the strapping head 5 is the strap sealing and shearing portion 15 which is mounted between a pair of parallel, substantially horizontal side plates 60 and 61. The side plates 60 and 61 are held in spaced-apart relationship by means of four spacers 77, 78, 79 and 80, respectively secured to the side plates 60 and 61 by means of bolts 77a, 78a, 79a and 80a, so as to provide a substantially open-sided box-like structure. A sheet metal cover (not shown) may be provided around this box-like structure for closing the sides thereof. The spacer 77 is provided with an inwardly extending arm 77b thereon for a purpose to be described below.

The mechanism for forming a joint in and sealing the strap loop in the sealing and shearing portion 15 consists of six joint forming or sealing jaws arranged in three vertically aligned pairs. More particularly, a pair of sealing jaws 82 is provided sandwiched between two pairs of sealing jaws 83, as illustrated in FIG. 5. The sealing jaws 82 and 83 are commonly pivoted on a pair of pivot pins 85 connected at the opposite ends thereof to the side plates 60 and 61. Each of the sealing jaws 82 and 83 is provided at the outer end thereof with a projection 86 which is adapted to engage the adjacent edge of a seal 142 for wrapping the seal 142 around adjacent overlapping portions of the strap web 11 and causing a seal joint to be formed by deforming the seal 142 and the adjacent overlapping portions of the strap web 11. The sealing jaws 82 and 83 are also interconnected by pins 91 to insure that the sealing jaws 82 and 83 will all move in unison. The inner ends of the sealing jaws 83 are respectively connected by means of pivot pins 92 to two toggle links 93 and 94, the toggle links 93 and 94 being coupled together adjacent to the other ends thereof by means of a pivot pin 95 which is secured at the opposite ends thereof to a pair of slides 96, one of which is illustrated in FIG. 6 and will hereinafter be referred to as the crosshead. Also mounted on the crosshead 96 inwardly of the pin 95 is a pin 98. A pair of links 99 are pivotally connected adjacent to one end thereof to the pin 98, the links 99 being pivotally connected adjacent to the other end thereof to a pivot pin 100 mounted on a gear sector 101. The gear sector 101 is pivotally mounted to the side plate 61 by means of a pivot pin 102, the gear sector 101 being provided along the arcuate edge thereof with a plurality of gear teeth 103 disposed for meshing engagement with a plurality of teeth 104 on a rack 105. The rack 105 is mounted by means of screws 107 to a piston rod 108 of an air piston 109, the upper and lower ends of the rack 105 being respectively disposed in grooves 106 formed in the side plates 60 and 61 for guiding the reciprocating movement of the rack 105.

There is also provided a movable shear blade 110 the construction and operation of which are disclosed in detail in the aforementioned U.S. Pat. No. 3,139,813. The shear blade is provided with elongated openings therein for accommodating the pivot pins 85 therethrough, whereby the shear blade is held in place between the side plates 60 and 61. The shear blade is positioned for engagement by the linkage of the sealing jaws 83 during the movement thereof, for effecting movement of the shear blade between a retracted position out of engagement with the strap and a shearing position wherein a cutting edge on the shear blade overlies the upper end 55b of the backing plate 55 for shearing the supply portion of the strap web 11. When the shear blade 110 is moved to its shearing position, the shearing edge thereof and the upper end 55b of the backing plate 55 cooperate to form a pair of shear blades for effecting that severing of the strap web 11. When the sealing jaws are returned to their completely open or deactuated condition, the linkage engages the shear blade for moving it back to its retracted position.

Figure 7:
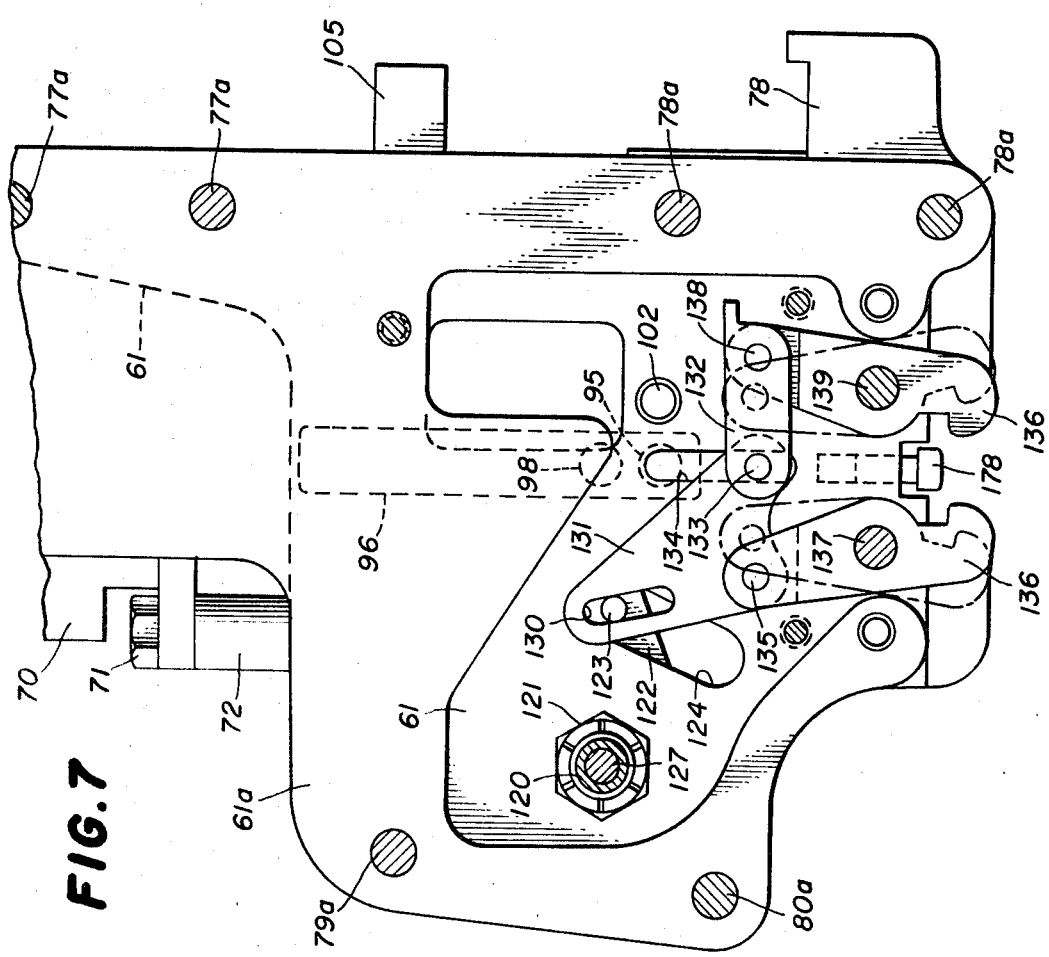
FIG. 7 is a further enlarged fragmentary view in horizontal section, taken along the lines 7—7 in FIG. 5 and rotated 90° clockwise, and illustrating the gathering jaws.
Figure 9:
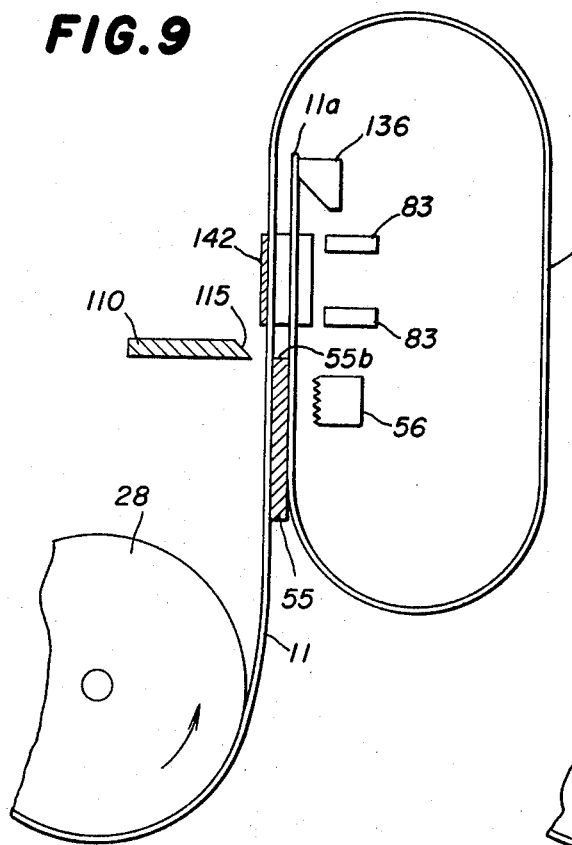
FIG. 9 is a diagrammatical representation of the strapping machine of this invention, illustrating the stage at which the strap is loosely encircled about the object.
Figure 10:
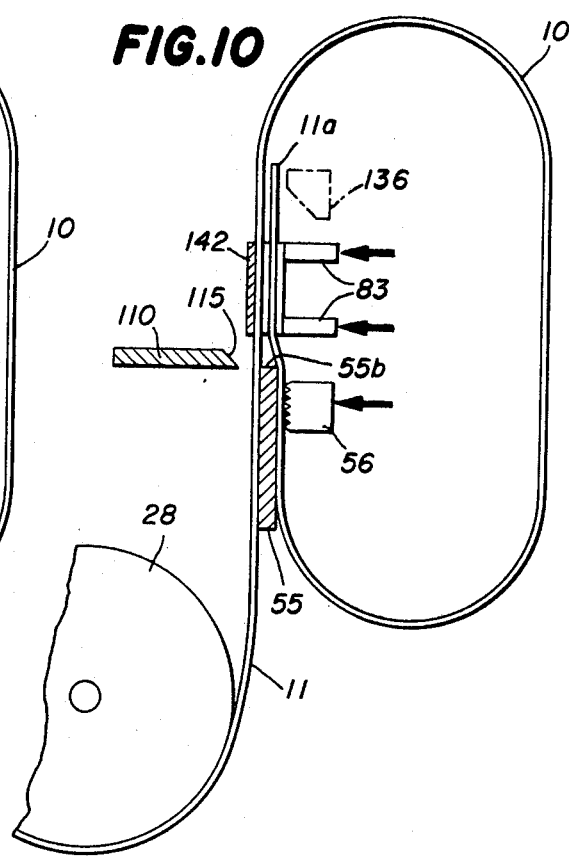
FIG. 10 is a diagrammatical representation similar to FIG. 9, and illustrating the relative positions of the parts at the beginning of the tensioning of the strap loop.

Immediately above the strap sealing and shearing portion 15 is the strap gathering jaw portion 17, as is illustrated in FIGS. 5 to 7 of the drawings. A lever 155 is provided intermediate the ends thereof with a pivot joint 154 for pivotally mounting the lever 155 on the spacer 79 between the side plates 60 and 61. The lever 155 is provided at the outer end thereof with a cam arm 156 having camming surfaces 156a thereon. Extending upwardly from the cam arm 156 adjacent to the coupling joint 155 is a pivot pin 157. Another pivot pin 158 extends upwardly from the lever 155 adjacent to the inner end thereof, the pivot pin 158 being received in an elongated slot 159 in a coupling member 160, the pivot pin 158 being secured to the coupling member 160 by means of a cotter pin 161. The coupling member 160 is in turn secured by a pin 163 to the outer end of a piston rod 162 of an air piston 165, the air piston 165 being securely mounted by means of a nut 164 to the mounting arm 77b of the spacer 77.

A generally L-shaped link 117 is pivotally mounted at one end thereof on the gear sector 101 by means of a pivot pin 116, the link 117 being provided adjacent to the other end thereof with an elongated slot 118 receiving the pin 157 of the cam arm 156 therethrough. Extending vertically through the side plate 61 is a hollow shaft 120 secured to the side plate 161 by means of a nut 121. Pivotally mounted on the hollow shaft 120 is a latch plate 122 provided with a notch 122a in the outer edge thereof. One end of the latch plate 122 is provided with a pin 123 secured thereto by means of a nut 123a and extending vertically upwardly therefrom through an elongated opening 124 in the side plate 61. Secured between the nut 123a and the lower surface of the latch plate 122 is an annular cam member 119 arranged for camming engagement with the camming surfaces 156a on the cam arm 156. The latch plate 122 is also provided with a pin 125 extending downwardly therefrom adjacent to the notch 122a and having secured thereto one end of a tension spring 126, the other end of the tension spring 126 being secured to an anchor pin 126 a mounted on the side plate 61. Extending axially through the hollow shaft 120 is a latch bolt 127 provided with a generally U-shaped hook 127a at the lower end thereof, the free end of the hook 127a extending upwardly, parallel to the bolt 127, and engaged in the notch 122a in the latch plate 22. The upper end of the latch bolt 127 protrudes above the upper side of the side plate 61 and is provided with an encircling compression spring 128 held under compression against the upper surface of the side plate 61 by a cotter pin 129, whereby the latch bolt 127 is urged upwardly as viewed in FIG. 5. When the latch bolt 127 is disposed in its upward position, the free end of the hook 127a is engaged in a complementary opening (not shown) in the side plate 61 for preventing rotational movement of the latch plate 122 with respect to the latch bolt 127.

The upper end of the pin 123 is engaged in a slot 130 in a generally triangular-shaped link 131, the link 131 being pivotally connected by means of a pivot pin 133 to one end of another link 132, the pin 133 being guided in a slot 134 formed in the side plate 61. The link 131 is also pivotally connected by means of a pivot pin 135 to the inner end of one of a pair of gathering jaws 136, which one jaw 136 is in turn mounted for pivotal movement about a pivot pin 137 secured to the side plate 61. The other end of the link 132 is pivotally connected by means of a pin 138 to the inner end of the other of the gathering jaws 136, which is in turn mounted for pivotal movement about a pivot pin 139 mounted in the side plate 61. As indicated in FIG. 7, the gathering jaws 136 are pivotally movable about the pivot pins 137 and 139 between a closed position, illustrated in solid lines in FIG. 7 and in open position, illustrated in broken lines in FIG. 7.

Above the strap gathering jaw portion 17 is the seal storing and feeding portion 18. Referring particularly to FIGS. 4 and 5 of the drawings, a seal storage magazine 141 extends along the front side of the main support plate 12 immediately above a side plate 61c. Side plate 61c is disposed immediately above a side plate 61a, which is in turn disposed immediately above the side plate 61, the side plates 61, 61a and 61c all being secured together by means of the same bolts 77a, 78a, 79a and 80a which maintain the side plates 60 and 61 assembled together with their spacers. The side plate 61a is provided with an irregular cutout surface which accommodates the gathering jaws 136 and the operating mechanism therefore, which is best illustrated in FIG. 7. The seal magazine 141 houses a plurality of nested channel-shaped seals 142, the exact construction of which is disclosed in detail in the aforementioned U.S. Pat. No. 3,139,813. The seals 142 are stacked in the seal magazine and are held in the stacked condition therein by means of a spring-loaded weight 143. The outermost seal 142 is positioned with its depending legs resting against a pair of retaining plates 144 secured to the outer end of the seal magazine 141.

Connected to the upper edge of the seal magazine 141 is a generally horizontally extending pivot pin 146 having pivotally mounted thereon a seal feed arm 147. The free end of the arm 147 is provided with a pivot pin 149 having pivotally mounted thereon a seal feed bar 148. Disposed through the seal feed arm 147 adjacent to the pivot pin 146 and substantially parallel thereto is a pivot pin 151 having pivotally connected thereto a coupling member 152, which is in turn coupled to the piston rod 153 of an air-actuated piston 150, which is secured to the front surface of the main support plate 12. Normally, the piston rod 153 is withdrawn into the cylinder of the piston 150, thereby holding the seal feed arm 147 in a retracted position illustrated in FIG. 4, with the seal feed bar 148 resting against the outer one of the seals 142. As soon as the piston 150 is actuated, the seal feed arm 147 is moved into its seal feeding position illustrated in FIG. 5, wherein the seal feed bar 148 pushes the outer seal 142 downwardly along the inner surface of the supply portion of the strap web 11 to a sealing position between the sealing jaws 82 and 83, as illustrated in phantom in FIG. 5. Retraction of the piston rod 153 causes movement of the seal feed arm 147 back to the retracted position thereof.

Above the seal magazine 141 is a strap guide (not shown) which extends upwardly from the seal magazine 141 and is held in place by being bent around two pins 173 and 174 which are mounted in a guide support block 175 affixed to the outer side of the main support plate 12. On both sides of the guide support block 175 are mounted side guides 166 which are spring loaded against the guide support 165 and which can be separated to allow for the removal of the strap from therebetween. Likewise, there are two side plates 167 and 168, the side plates 167 being respectively disposed on opposite sides of the straightening block 49, and the side plates 168 being respectively disposed on opposite sides of the portion of the track adjacent to the idler wheel 28 immediately below the side plates 167. The side plates 167 and 168 are likewise spring loaded laterally against their supports. More particularly, all of the side guides 166, 167 and 168 are provided with inwardly turned flanges 166a, 167a and 168a for temporary strap retention. Helical tension springs 169 are secured between each of the pairs of side plates 166, 167 and 168 at spaced-apart points therealong for biasing the side plates toward each other, each of the coil springs 169 terminating in a hooked end engaging complementary holes in the associated side plates, as illustrated in FIG. 4.

As illustrated in FIGS. 5 and 7, there is provided a spring loaded plunger 178 which is urged to the right, as viewed in FIG. 5, for deflecting the leading end 11a of the strap 11 when it is initially fed past the gathering jaw portion 17 to urge the strap end 11a away from the seals 142 stacked in the seal magazine 141, thereby preventing any contact of the strap end 11a with the seals 142 which might arrest the strap feed.

Referring now to FIGS. 4 to 12 of the drawings, the mechanical operation of the strapping machine 1 will be described in detail. Initially, a package or object 7 is placed upon the roller 6 adjacent to the strapping head 5, as illustrated, for example, in FIG. 3. The package 7, which will commonly be an annular coil of material, has a width "L" which is less than the distance "D1" between the upper end of the gathering jaws 136 and the lower end of the gripping jaws 56 (see FIG. 5). A length of strapping web 11 is fed from a suitable supply thereof through the guide chute 41 in the direction of the arrow in FIG. 4, for guiding the strap between the feed wheel 20 and the idler wheel 28. Then, the feed wheel 20 is rotated by the air motor 22 for frictionally feeding a length of the strap web 11 around the idler wheel 28, between the backing plate 55 and the straightening roller 50, between the gripping jaws 56, the sealing jaws 82 and 83 and the gathering jaws 136, through the side plates 166 and into a region therebeyond. This leaves the leading end 11a of the strap web 11 protruding above the level of the strap head 5. At this time, the seal feed piston 150 is actuated for moving the seal feed arm 147 to its feeding position, wherein the seal feed bar 148 feeds a seal 142 into a sealing position between the sealing jaws 82 and 83, as illustrated in FIG. 5. The length of strap 11 positioned in the strapping head 5 acts as a guide, along the inner surface of which the seal 142 is fed, the strap web 11 also serving as a retaining means to prevent the seal 142 from dropping out of the head 5 after it is fed into the sealing position.

When the seal feed arm 147 is thus moved to its feeding position, the outer end of the pivot pin 151 engages the upper end of the latch bolt 127 for moving the latch bolt 127 downwardly against the urging of the compression spring 128 to a position illustrated in FIG. 5, wherein the free end of the hook 127a is disengaged from the complementary opening in the side plate 61. Thus released for pivotal movement about the hollow shaft 20, the latch plate 122 is urged by the tension spring 126 in a counterclockwise direction, as viewed in FIG. 6, into the position illustrated in FIG. 6, wherein the pin 123 is disposed at the inner end of the slot 124 and the cam member 119 is disposed in camming engagement with the cam surface 156a on the cam arm 156. This rotation of the latch plate 122 by the tension spring 126 causes a corresponding movement of the links 131 and 132 into the position illustrated in FIG. 7 for moving the gathering jaws 136 toward each other into the closed position illustrated in solid lines in FIG. 7. In this closed position, the gathering jaws 136 cooperate with the plunger 178 to restrain the strap web 11 from transverse movement, while permitting longitudinal movement thereof.

The leading end 11a of the strap 11 is then grasped by an operator and manually encircled around and beneath the portion of the annular coil 7 to be strapped, the strap end 11a then being guided by appropriate guide means (not shown) upwardly between the retaining flanges 167a of the side plates 167 and the outer surface of the backing plate 55. The strap end 11a is then guided upwardly along the backing plate 55 between the gripping jaws 56 and the sealing jaws 82 and 83 and is finally deflected inwardly by sloping surfaces 177 on the closed gathering jaws 136 for arresting the upward movement of the strap end 11a as illustrated in FIG. 5. At this time, the object 7 rests on the associated conveyor roller 6 with the strap loop 10 loosely surrounding it, in the manner illustrated in FIG. 3. The piston 70 is then actuated to move the gripping jaws 56 into the closed positions thereof, for firmly clamping the leading end 11a of the strap between the serrated jaw portions 57 and the outer surface of the backing plate 55, thereby securely holding the leading end 11a of the strap against retrograde motion. It will be noted that, at this time, the leading end 11a of the strap overlaps the supply portion thereof from the gripping jaws 56 to the retaining jaws 136.

In prior strapping machines of the type illustrated in the aforementioned U.S. Pat. No. 3,139,813, the upper ends of the gathering jaws 136 served as an abutment against which the supply portion of the strap was engaged as it was tensioned about the object being trapped. Thus, the gathering jaws 136 cooperated with the gripping jaws 56 to define therebetween a straight portion of the strap 11 to facilitate the application of the seal 142 therearound. However, when the portion of the object 7 facing the strapping head 5 has a dimension "L" longitudinally of the strap which is less than the distance "D1" between the abutments formed by the upper end of the gathering jaws 136 and the lower end of the gripping jaws 56, it will be impossible to completely tension the strap 11 about the object 7. More particularly, the gap between the upper surface of the object 7 and the upper end of the gathering jaws 136 will produce an undesirable slack condition in the strap loop 10 when the sealed and served strap loop is removed from the strapping head 5. Since the jaws 56, 82, 83 and 136 had already been compacted into as small a longitudinal space as possible, the dimensions of these jaws imposed a lower limit on the size of object which could be strapped by the machine 1. Accordingly, as an important feature of the present invention, the seat in the strapping head 5 for the strap 11 defining the straight portion of the loop 10, is shortened so that it has a length less than the small dimension "L" of the facing portion of the object 7. This short seat is provided by moving the sealing jaws 82 and 83 and the gathering jaws 136 into a loop-tensioning configuration.

More particularly, simultaneously with the closing of the gripping jaws 56, the piston 165 is actuated in the direction of the arrow in FIG. 6 for moving the lever 155 in a counterclockwise direction about the pivot joint 154, as viewed in FIG. 6. This counterclockwise movement of the lever 155 causes the camming surfaces 156a of the cam arm 156 to move the latch plate 122 in a counterclockwise direction about the hollow shaft 120 against the urging of the tension spring 126 until the pin 123 is disposed at the outer end of the slot 124. This movement of the pin 123 causes a corresponding movement of the links 131 and 132 for moving the gathering jaws 136 back into the open positions thereof illustrated in broken lines in FIG. 7.

Figure 11:
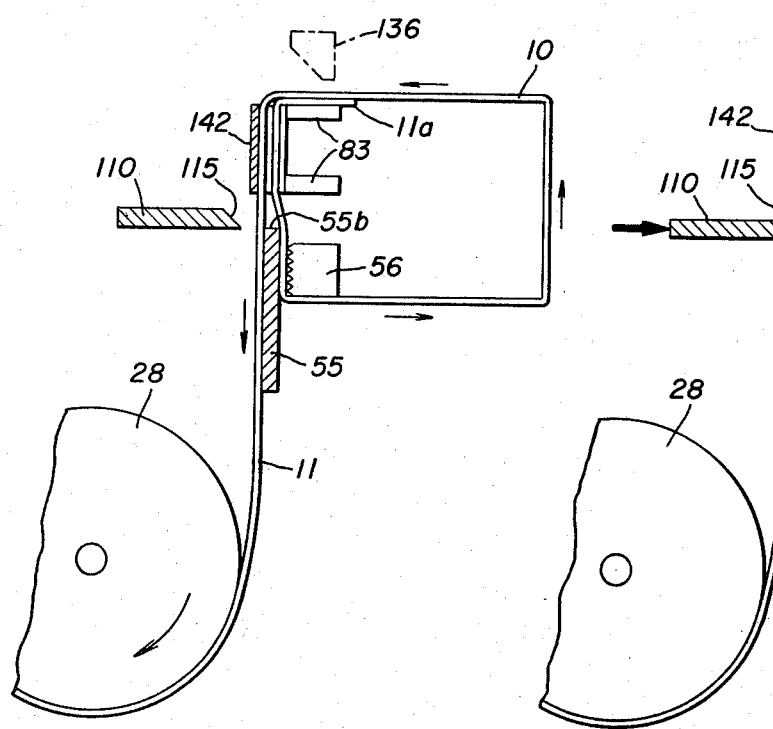
FIG. 11 is a diagrammatical representation similar to FIGS. 9 and 10, illustrating the relative positions of the parts during tensioning of the strap loop.
Figure 12:
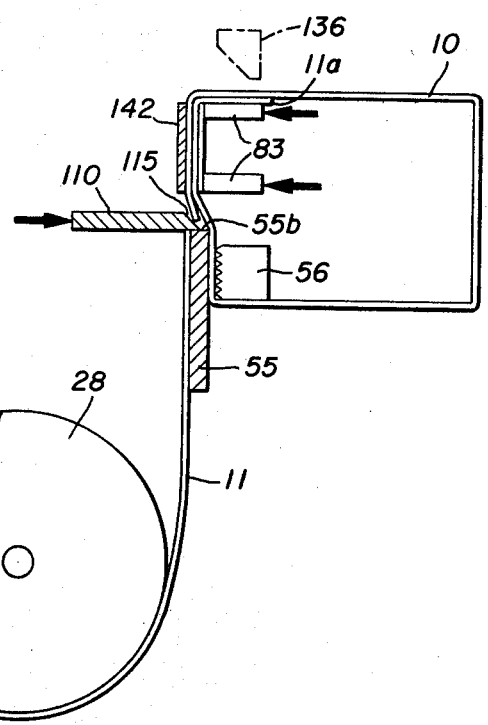
FIG. 12 is a diagrammatical representation similar to FIGS. 9 to 11, and illustrating the relative positions of the parts immediately after formation of the seal joint.

This counterclockwise movement of the lever 155 also causes the pin 157 to engage the adjacent end of the link 117 for effecting movement thereof in a right-hand direction, as viewed in FIG. 6. This movement of the link 117 causes a pivotal movement of the gear sector 101 sufficient to move the sealing jaws 82 and 83, through the action of the links 93, 94 and 99, into a partially closed position illustrated in broken lines in FIG. 6. In this partially closed position, the projections 86 on the sealing jaws 83 will deflect the side legs of the seal 142 toward each other into a partially closed position illustrated in broken lines in FIG. 6. Thus, the projections 86 and the seal 142 cooperate with the strap guide 75 to prevent transverse movement of the strap 11, while accommodating longitudinal movement thereof. Thus, it will be appreciated that with the opening of the gathering jaws 136, the sealing jaws 82 and 83 have been moved into a partially closed position in which they take the place of the gathering jaws 136, with the upper ends of the upper selling jaws 83 providing an abutment against which the strap 11 will be engaged during the tensioning thereof, as illustrated in FIG. 11. This abutment will cooperate with the gripping jaws 56 to define a shortened straight portion of the strap loop for facilitating the clamping of the seal 142 therearound as explained above. However, referring to FIG. 5, it will be observed that this shortened straight portion of the loop has a length D2 which is less than the relatively short dimension "L" of the facing portion of the object 7. Thus, the strap 11 can be securely bound about the object in a tensioned condition. In the preferred embodiment of the invention the distance D1 is approximately 3.25 inches, while the distance D2 is only about 2.5 inches.

Simultaneously with the closing of the gripping jaws 56, the opening of the gathering jaws 136 and the partial closing of the sealing jaws 82 and 83, the air motor 22 is actuated to drive the feed wheel 20 in a reverse or counterclockwise direction, as illustrated in FIG. 4, for withdrawing the supply portion of the strap 11 from the head 5, thereby taking up the slack in the strap loop 10. When all the slack has been taken up from the strap loop 10, the feed wheel 20 causes the strap loop to be tensioned to a predetermined tension, at which point a signal from the tensioning means causes actuation of the piston 109 to cause the sealing and shearing portion 15 to form a joint between the overlapped portions of the strap 11 and sever the supply portion of the strap therefrom. Thus, referring to FIG. 6, the actuation of the piston 109 causes the piston rod 108 and the attached rack 105 to be moved in a right-hand direction as viewed in FIG. 6, causing a corresponding further pivotal movement of the gear sector 101 in the clockwise direction. It will be noted that this movement of the gear sector 101 causes a corresponding right-hand movement of the link 117, accommodated by the elongated slot 118 therein. The pivotal movement of the gear sector 101 causes a corresponding movement of the links 93, 94 and 99 to move the sealing jaws 82 and 83 from the partially closed position thereof into a fully closed position, wherein the projections 86 urge the adjacent legs of the seal 142 inwardly to a position slightly embedded in the adjacent portion of the strap 11. Thus, an effective seal joint is formed by the seal 142 between the overlapped ends of the strap 11 disposed between the sealing jaws 82 and 83. As the sealing jaws 82 and 83 reach their fully closed positions, linkage thereof engages the shear blade, thereby urging the shearing edge of the shear blade through the supply portion of the strap 11 immediately below the seal 142, for severing the supply portion of the strap 11 from the tensioned and sealed strap loop 10.

Simultaneously with the actuation of the piston 109, the piston 150 is returned to its initial position thereby moving the seal feed arm 147 to its retracted position and releasing the latch bolt 127 into its normal upward position, with the free end of the hook 127a in engagement with the complementary opening in the side plate 61. Thus, the latch plate 122 is again restrained from pivotal movement with respect to the hollow shaft 120 and the gathering jaws 136 are locked in their open positions. Subsequently, the piston 109 is released, permitting retraction of the piston rod 108, which results in movement of the sealer jaws 82 and 83 back to the fully open positions thereof illustrated in solid lines in FIG. 6, as well as movement of the shear blade 110 back to its retracted position. This retraction of the piston rod 108 also serves to move the lever 155, through the action of the link 117 and the pin 157, in a clockwise direction back to the normal position thereof illustrated in FIG. 6. Simultaneously with this release of the piston 109, the piston 70 is released to accommodate movement of the gripping jaws 56 back to the open positions thereof. Thus, all of the jaws 56, 82, 83 and 136 are opened, permitting removal of the object 7 with the strap 10 tensioned therearound from the strapping machine head 5.

Figure 13:
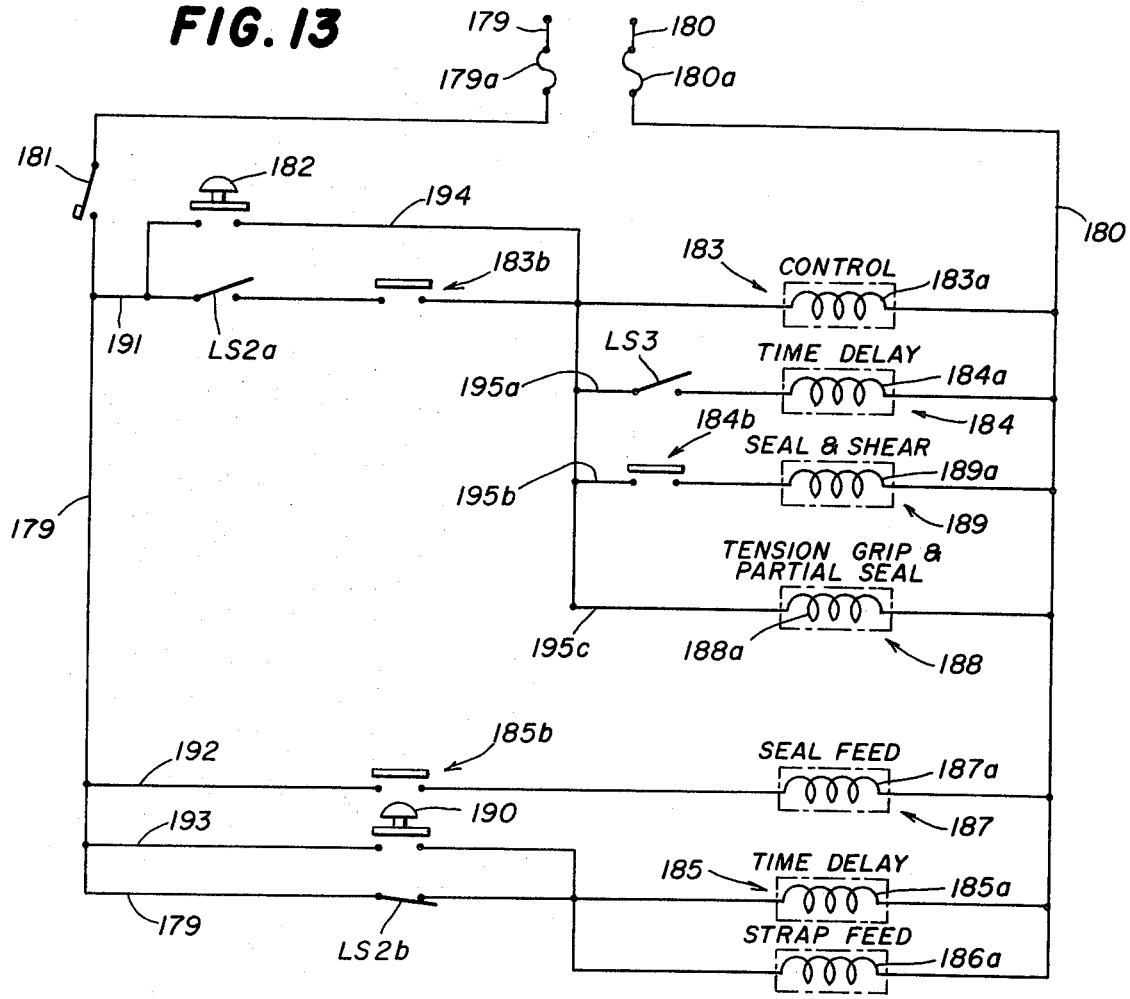
FIG. 13 is a schematic circuit diagram of the electric control circuitry for the strapping machine of the present invention.
Figure 14:
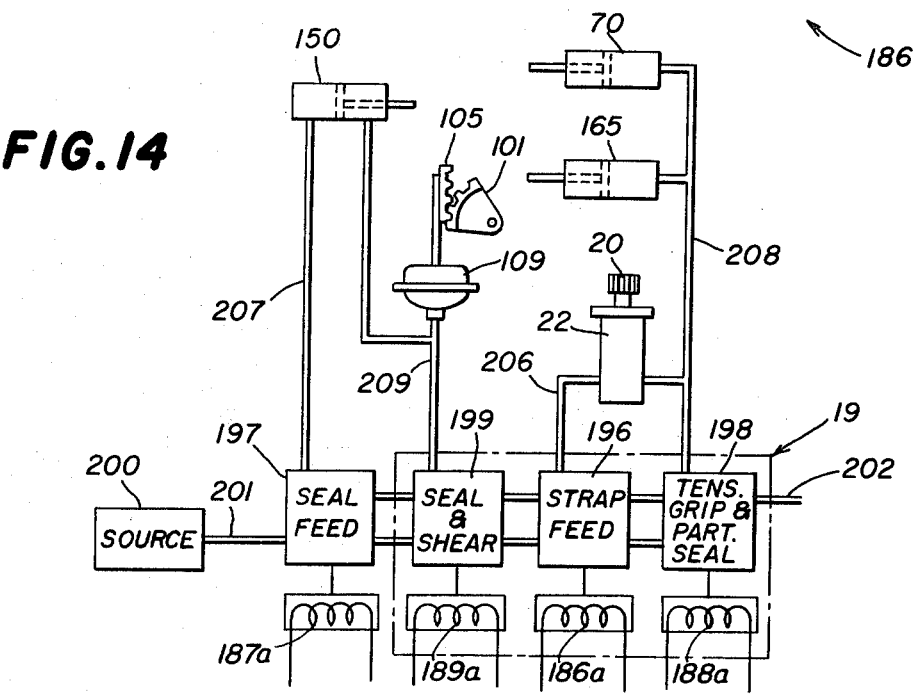
FIG. 14 is a diagrammatic representation of the pneumatic control circuit for the strapping machine of the present invention.

Referring now to FIG. 13, the electric control circuitry for the strapping machine 1 will now be described. As illustrated, a pair of power input lines 179 and 180 are provided leading from a suitable source of electric power, the lines 179 and 180 being connected through fuses 179a and 180a. The input line 179 is connected through a master control switch 181, to a normally closed switch LS2b and two parallel connected branch conductors 192 and 193. Connected in parallel between the switch LS2b and the other power line 180 are the coil 185a of a time delay relay 185 and the coil 186a of a strap feed valve solenoid 186. Connected in parallel with the switch LS2b by a conductor 193 is a manual seal feed switch 190. Connected in series between the power lines 179 and 180 by the conductor 192 are the contacts 185b of the time delay relay 185 and the coil 187a of a seal feed solenoid 187. Connected in series between the power lines 179 and 180 by the conductor 191 are a normally open switch LS2a, and the contacts 183b and the coil 183a of a control relay 183. Connected by means of a conductor 194, in parallel with the series combination of the switch LS2a and relay contacts 183b, is a manual cycle switch 182. Connected in parallel with the coil 183a of the control relay 183 are three parallel branch conductors 195a, 195b and 195c. A normally open switch LS3 and the coil 184a of a time delay relay 184 are connected in series by the conductor 195a; the contacts 184b of the time delay relay 184 and the coil 189a of a seal and shear solenoid 189 are connected in series by the conductor 195b; and the coil 188a of a tension, grip and partial seal solenoid 188, is connected in parallel with the relay coil 183a by the conductor 195c. If desired, a manual sealer switch may also be directly connected between the input line 179 and the coil 189a of the sealer solenoid 189. Also, the switches LS2a and LS2b may form the poles of a double-pole, single-throw switch.

In FIG. 15, which illustrates the pneumatic control circuit for the strapping machine 1, there are shown four control valves 196, 197, 198 and 199, three of which are preferably physically positioned together in the manifold 19 as illustrated in FIG. 4. The valves 196, 197, 198 and 199 are connected in parallel between a common input conduit 201 and a common exhaust conduit 202, the input conduit being connected to a source 200 of high-pressure air and the exhaust conduit 202 being vented to the atmosphere. Leading from the valve 196 is a conduit 206 which leads to one side of the air motor 22, another conduit 208 leading from the valve 198 to the other side of the air motor 22. The conduit 208 also leads to the cylinders of the pistons 70 and 165. Leading from the valve 197 to one side of the double-acting piston/50 is a conduit 207. The other side of the cylinder/50 is connected by a conduit 209 to the valve 199, the conduit 209 also being connected to the cylinder of piston 109. The pistons 70, 109 and 165 are all of the spring-return type.

To summarize the operation of the strapping machine 1, with respect to the electrical and pneumatic control circuits, the machine is initially put into operation by inserting the leading end 11a of a strap web 11 through the feed chute 41 and between the feed wheel 20 and the idler wheel 28. The supply of strap is ordinarily a coil of strap positioned in a convenient location relative to the location of the strapping machine 1. Also, the operator must fill the seal magazine 141 with a plurality of stacked seals 142 by first removing the spring loaded weight 143 and then replacing it after the seals 141 have been placed in the magazine 141. Initially, the piston 150 is conditioned to hold the seal feed arm 147 in its retracted position, the manual cycle switch 182 and manual seal feed switch 190 are open, the master switch 181 is open, and the relay contacts 183b, 184b, and 185b are all open. At this time the master switch 181 is closed, thereby energizing the strap feed solenoid coil 186a and the time delay relay coil 185a through an energizing circuit including the power line 179, the normally closed switch LS2b, the parallel-connected coils 185a and 186a and the power line 180. Thus energized, the solenoid 186 actuates the strap feed valve 196 to cause pressurized air from the source 200 to be fed through the conduits 201 and 206 to the air motor 102 for driving the feed wheel 20 in a strap-feeding direction. The leading end 11a of the strap is thus fed around the idler wheel 28 and upwardly around the backing plate 55 and the straightening roller 50, between the jaws 56, 82, 83 and 136 and beyond the side plates 166. The energized time delay relay 185 permits the strap 11 to be fed for approximately one second, in the preferred embodiment of this invention. This is accomplished by having the relay 185 delay the closing of its contacts 185b for one second after the energization of the coil 185a. After this one second delay, the relay contacts 185b close, thereby energizing coil 187a of the seal feed solenoid 187 through an obvious circuit. Thus energized, the seal feed solenoid 187 actuates the seal feed valve 197 to cause pressurized air to be fed from the source 200 through the conduits 201 and 207 to one side of the piston 150 for moving the seal feed arm 147 to the feeding position thereof illustrated in FIG. 5. Thus, as described above, a seal 142 is fed from the seal magazine 141 into a sealing position between the sealing jaws 82 and 83.

It will be observed that the seal 142 has a length substantially equal to the distance between the upper end of the sealing jaws 83 to the lower end of the lower sealing jaws 83, the seal 142 being so positioned that the upper and lower ends thereof are, respectively, substantially flush with the upper and lower ends of the sealing jaws 83. The seal feed arm 147 is coupled, by means not shown, to the switches LS2a and LS2b, the seal feed arm 147 in its retracted position holding the switches LS2a and LS2b in their normal positions, illustrated in FIGS. 13. Movement of the seal feed arm 147 to its feeding position, closes the switch LS2a and opens the switch LS2b. The closing of the switch LS2a merely prepares a holding circuit for the control relay 183 for future use when the cycle switch 182 is closed. The opening of the switch LS2b immediately de-energizes the time delay relay 185 and the strap feed solenoid 186, thereby arresting the strap feed. The de-energization of the time delay relay 185 causes the contacts 185b thereof to open, thereby de-energizing the seal feed solenoid 187 and cutting off the supply of air to the piston 150 through the seal feed valve 197. As described above, the movement of the seal feed arm 147 to its feeding position, causes the latch bolt 127 to be depressed thereby releasing the latch plate 122 and closing the gathering jaws 136.

The one second delay period for the strap feed is calculated to feed out only enough strap 11 so that the leading end 11a thereof projects slightly above the strapping head 5, this not being intended to be enough length of strap for encircling the package to be strapped. Therefore, the manual strap feed switch 190 is closed to feed out additional strap 11 by re-energizing the strap feed solenoid 186. The manual strap feed switch 190 is held closed for as long a period as is required to feed out the length of strap 11 needed to encircle the object being strapped. Even though the electrical circuit may permit the time delay relay solenoid 185 to again be energized, the possible reclosing of the time delay relay contacts 185 will have no effect, since the seal feed arm 147 is already in its feeding position. With sufficient strap 11 drawn off, the operator releases the manual strap feed switch 190 and manipulates the strap over, around, and beneath the package 7 to be strapped and forces the leading end 11a upwardly between the jaws of the strapping head, as described above, until the leading end abuts against the gathering jaws 136, thereby halting the upward movement of the leading strap end 11a.

It should be emphasized that the feeding of the seal 142 is deliberately delayed until after the strap 11 is fed into the strapping head 5 during the 1 second time delay. This is in order to feed the strap 11 into position with a minimum of possibility of the leading end 11a thereof snagging on anything in its path. With both the seal feed magazine 141 and the seal 142 out of the path of the strap at this time, there is a substantially clear path for the strap 11 to follow through the strapping head 5. Another advantage of this sequence of the seal feed is that the strap 11 itself acts as a guide during the time that the seal 142 is fed into the sealing position, the strap 11 also acting as a support for the seal 142 to prevent its dropping out of the strapping head 5.

With the strap 11 loosely encircled in a loop 10 about the object 7, the cycle switch 182 is manually closed, thus energizing the coil 188a of the tension, grip and partial seal solenoid 188 through an obvious circuit. Thus energized, the solenoid 188 actuates the valve 198 to permit pressurized air to flow from the source 200 through the conduit 201 to the conduit 208. From the conduit 208 the air flows to the air motor 22, the gripping piston 70 and the partial seal piston 165 for simultaneous actuation thereof. Thus, simultaneously, the gripping jaws 56 are closed for securely clamping the leading end 11a of the strap against the backing plate 55; the lever 155 is driven to open the gathering jaws 136 and to partially close the sealer jaws 82 and 83; and the air motor 22 is actuated for driving the feed wheel 20 in a reverse direction for withdrawing the supply portion of the strap 11 from the head 5, thereby taking up the slack in the strap loop 10, all of which operations are described in detail above.

The closure of the cycle switch 182 also momentarily energizes the coil 183a of the control relay 183, thereby closing the relay contacts 183b and completing a holding circuit through the closed switch LS2a for maintaining the control relay 183 and the tension grip and partial seal solenoid 188 energized after release of the cycle switch 182.

After all of the slack has been taken up from the strap loop 10, the operation of the air motor 22 continues until a predetermined tension is reached in the strap loop 10. When this predetermined tension is reached, the idler wheel shaft 29 is rotated about the shaft 32, causing rotation thereof and consequent pivotal movement of the arm 37. This movement of the arm 37 causes a corresponding movement of the actuator arm 40 of the switch LS3 for effecting a closure thereof. The closing of the switch LS3 provides an obvious energizing circuit for the coil 184a of the time delay relay 184. Energization of the time delay relay 184 causes closure of the relay contacts 184b after a short time delay, for energizing the coil 189a of the seal and shear solenoid 189. Thus energized, the solenoid 189 actuates the seal and shear valve 199 to permit pressurized air to be fed from the source 200 through the conduits 201 and 209 to the piston 109. Thus actuated, the piston 109 moves the sealer jaws 82 and 83 to their fully closed position for effecting the formation of the seal joint about the overlapped portions of the strap 11, and shearing of the supply portion of the strap from the tensioned and sealed loop 10, as described above. The conduit 209 is also connected to the other side of the seal feed piston 150 for moving the seal feed arm 147 back to the retracted position thereof illustrated in FIG. 4. This retraction of the seal feed arm 147 releases the latch bolt 127 to its upward position in engagement with the side plate 61 for again locking the gathering jaws 136 in their open position as described above.

In the retracted position thereof, the seal feed arm 147 again opens the switch LS2a and closes the switch LS2b. The opening of the switch LS2a breaks the energizing circuit for the solenoids 188 and 189 and the relays 183 and 184. Thus, the relay contacts 183b and 184b are opened and the valves 198 and 199 are actuated to shut off the supply of air to the air motor 22, and to the pistons 70, 109 and 165. Thus, the strap withdrawal is terminated and the gripping jaws 56 and the sealing jaws 82 and 83 are all returned to their open positions and the shear blade is returned to its retracted position, as described above. The closure of the switch LS2b again energizes the time delay relay 185 and the strap feed solenoid 186 for again feeding a length of strap up into the strapping head 5 during the 1 second time delay and, immediately thereafter, feeding another seal 142 into a sealing position in the strapping head 5. Thus, the strapping machine 1 is again conditioned for another strapping cycle upon the next closure of the cycle switch 182.

From the foregoing it can be seen that there has been provided an improved strapping machine for tensioning a strap in a loop about an object, wherein the portion of the object facing the strapping head has a relatively small dimension longitudinally of the strap.

More particularly, there has been provided an improved strapping machine including gripping jaws, sealing jaws and strap gathering jaws, wherein the gripping jaws and the gathering jaws cooperate to define a pair of abutments separated by a distance greater than the relatively small dimension of the facing portion of the object, while the gripping jaws and the sealing jaws cooperate to form a second pair of abutments separated by a distance less than the relatively small dimension of the facing portion of the object. Prior to the tensioning of the strap loop, the gathering jaws are opened and the sealing jaws are partially closed to perform the function of the gathering jaws, whereby the strap loop can be securely tensioned about the object.

There has also been provided a novel linkage mechanism interconnecting the sealing jaws and the gathering jaws, whereby the sealing jaws may be moved to their partially closed position simultaneously with the opening of the gathering jaws. In addition, there has been provided an improved strapping machine wherein the novel linkage is driven by an air-actuated piston.

Finally, there has been provided an improved strapping machine including seal feed mechanism directly driven by a separate air-actuated piston.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A strapping machine for applying a strap around an object wherein the portion of the object facing the machine has a first dimension in a direction longitudinally of the applied strap, said strapping machine comprising strap gathering means movable between a closed position engaging the strap for limiting the longitudinal movement of the leading end thereof along the supply portion thereof and an open position out of engagement with the strap, a strap gripper for holding the strap encircled in a loop about the object with the leading end of the strap overlapping the supply portion of the strap from said gripper to said gathering means, the outer ends of said gathering means and said gripper respectively forming first and second abutments spaced apart a distance greater than the first dimension and cooperating to define a straight portion of the strap loop therebetween when said gathering means is in the closed position thereof, joint forming jaws disposed between said strap gripper and said gathering means in general alignment therewith longitudinally of the strap, the outer ends of said joint forming jaws forming a third abutment spaced from said second abutment a distance less than the first dimension for defining a shortened straight portion of the strap loop between said second and third abutments, tensioning means for tensioning the loop of strap by withdrawing the supply portion thereof relative to the leading end thereof, and means for moving said gathering means from the closed position to the open position thereof before operation of said tensioning means, said joint forming jaws having a first condition accommodating longitudinal movement of the supply portion of the strap by said tensioning means for tensioning the loop about the object and across said second and third abutments, said joint forming jaws having a second condition for securing together the adjacent overlapping portions of the strap to provide a joint therebetween along the shortened straight portion of the loop after tensioning thereof, the joint having a length less than the first dimension of the facing portion of the object for securing the strap in a tensioned condition about the object.

2. The strapping machine set forth in claim 1, wherein said strap gathering means comprises a pair of jaws encircling the adjacent portion of the strap in their closed position.

3. The strapping machine set forth in claim 1, wherein the distance between said first and second abutments is approximately 3.25 inches, and the distance between said second and third abutments is approximately 2.5 inches.

4. A strapping machine for applying a strap around an object wherein the portion of the object facing the machine has a first dimension in a direction longitudinally of the applied strap, said strapping machine comprising strap gathering means movable between a closed position engaging the strap for limiting the longitudinal movement of the leading end thereof along the supply portion thereof and an open position out of engagement with the strap, a strap gripper for holding the strap encircled in a loop about the object with the leading end of the strap overlapping the supply portion of the strap from said gripper to said gathering means, the outer ends of said gathering means and said gripper respectively forming first and second abutments spaced apart a distance greater than the first dimension and cooperating to define a straight portion of the strap loop therebetween when said gathering means is in the closed position thereof, joint forming jaws disposed between said strap gripper and said gathering means in general alignment therewith longitudinally of the strap, the outer ends of said joint forming jaws forming a third abutment spaced from said second abutment a distance less than the first dimension for defining a shortened straight portion of the strap loop between said second and third abutments, tensioning means for tensioning the loop of strap by withdrawing the supply portion thereof relative to the leading end thereof, said joint forming jaws having a first condition accommodating longitudinal movement of the supply portion of the strap by said tensioning means for tensioning the loop about the object and across said second and third abutments, said joint forming jaws having a second condition for securing together the adjacent overlapping portions of the strap to provide a joint therebetween along the shortened straight portion of the loop, first drive means coupled to said gathering means and to said joint forming jaws for simultaneously moving said gathering means to the open position thereof and said joint forming jaws to the first condition thereof, and second drive means coupled to said joint forming jaws for moving said joint forming jaws to the second condition thereof after tensioning of the loop, the joint having a length less than the first dimension for securing the strap in a tensioned condition about the object.

5. The strapping machine set forth in claim 4, wherein each of said first and second drive means includes a fluid-actuated piston.

6. The strapping machine set forth in claim 4, wherein said first drive means includes a first degree lever, means coupling said lever at one end thereof to said gathering means and to said joint forming jaws, and a fluid-actuated piston coupled to said lever adjacent to the other end thereof for effecting movement thereof.

7. The strapping machine set forth in claim 4, wherein said first drive means includes a first degree lever, first coupling means coupled to said gathering jaws and disposed in camming engagement with one end of said lever, second coupling means coupled to said lever adjacent to said one end thereof and coupled to said joint forming jaws, and a fluid-actuated piston coupled to said lever adjacent to the other end thereof for effecting movement thereof.

8. A strapping machine for applying a strap around an object wherein the portion of the object facing the machine has a first dimension in a direction longitudinally of the applied strap, said strapping machine comprising strap gathering means movable between a closed position engaging the strap for limiting the longitudinal movement of the leading end thereof along the supply portion thereof and an open position out of engagement with the strap, a strap gripper for holding the strap encircled in a loop about the object with the leading end of the strap overlapping the supply portion of the strap from said gripper to said gathering means, the outer ends of said gathering means and said gripper respectively forming first and second abutments spaced apart a distance greater than the first dimension and cooperating to define a straight portion of the strap loop therebetween when said gathering means is in the closed position thereof, joint forming jaws disposed between said strap gripper and said gathering means in general alignment therewith longitudinally of the strap and having a deactuated condition out of engagement with the strap and actuated conditions in engagement with the strap, the outer ends of said joint forming jaws forming a third abutment spaced from said second abutment a distance less than the first dimension for defining a shortened straight portion of the strap loop between said second and third abutments, tensioning means for tensioning the loop of strap by withdrawing the supply portion thereof relative to the leading end thereof, said joint forming jaws having a first actuated condition accommodating longitudinal movement of the supply portion of the strap by said tensioning means for tensioning the loop about the object and across said second and third abutments, said joint forming jaws having a second actuated condition for securing together the adjacent overlapping portions of the strap to provide a joint therebetween along the shortened straight portion of the loop, first drive means coupled to said gathering means and to said joint forming jaws for simultaneously moving said gathering means from the closed position thereof to the open position thereof and said joint forming jaws from the deactuated condition thereof to the first actuated condition thereof before tensioning of the loop, and second drive means coupled to said joint forming jaws for moving said joint forming jaws from the first actuated condition thereof to the second actuated condition thereof after tensioning of the loop, said second drive means being operative to move said joint forming jaws from the second actuated condition thereof to the deactuated condition thereof after formation of the joint, the joint having a length less than the first dimension for securing the strap in a tensioned condition about the object.

9. The strapping machine set forth in claim 8, and further including means coupling said first drive means to said second drive means, operation of said second drive means for moving said joint forming jaws to the deactuated condition thereof serving to move said first drive means to a retracted configuration accommodating movement of said gathering means to the closed position thereof.

10. A strapping machine for applying a strap around an object wherein the portion of the object facing the machine has a first dimension in a direction longitudinally of the applied strap, said strapping machine comprising seal feed mechanism movable between a feeding configuration for feeding a seal into a joint forming region adjacent to the supply portion of the strap and a retracted configuration, a fluid-actuated piston coupled to said seal feed mechanism for effecting movement thereof between the feeding and restricted configurations thereof, the seal having a length longitudinally of the strap less than the first dimension, a strap gripper for holding the strap encircled in a loop about the object with the leading end of the strap overlapping the supply portion of the strap in the joint forming region, joint forming jaws disposed in the joint forming region adjacent to the overlapped portions of the strap in general alignment with the gripper longitudinally of the strap, the outer ends of said joint forming jaws and said gripper respectively forming two abutments spaced apart a distance less than the first dimension and cooperating to define a straight portion of the strap loop therebetween in the joint forming region, and tensioning means for tensioning the loop of strap by withdrawing the supply portion thereof relative to the leading end thereof, said joint forming jaws having a first condition accommodating longitudinal movement of the supply portion of the strap by said tensioning means for tensioning the loop about the object and across said abutments, said joint forming jaws having a second condition for securing the seal about the adjacent overlapping portions of the strap to provide a seal joint therebetween along the straight portion of the loop after tensioning thereof, the seal joint having a length less than the first dimension of the facing portion of the object for securing the strap in a tensioned condition about the object.

11. A strapping machine for applying a strap around an object wherein the portion of the object facing the machine has a first dimension in a direction longitudinally of the applied strap, said strapping machine comprising a strap gripper for holding the strap encircled in a loop about the object with the leading end of the strap overlapping the supply portion of the strap, joint forming jaws disposed adjacent to the overlapped portions of the strap in general alignment with said gripper longitudinally of the strap, the outer ends of said joint forming jaws and said gripper respectively forming two abutments spaced apart a distance less than the first dimension and cooperating to define a straight portion of the strap loop therebetween, and tensioning means for tensioning the loop of strap by withdrawing the supply portion thereof relative to the leading end thereof, said joint forming jaws having a first partially closed position loosely encircling the adjacent overlapped portions of the strap and accommodating longitudinal movement of the supply portion of the strap by said tensioning means for tensioning the loop about the object and across said abutments, said joint forming jaws having a second fully closed condition for securing together the adjacent overlapping portions of the strap to provide a joint therebetween along the straight portion of the loop after tensioning thereof, the joint having a length less than the first dimension of the facing portion of the object for securing the strap in a tensioned condition about the object.

12. A strapping machine for applying a strap around an object wherein the portion of the object facing the machine has a first dimension in a direction longitudinally of the applied strap, said strapping machine comprising a strap gripper for holding the strap encircled in a loop about the object with the leading end of the strap overlapping the supply portion of the strap, joint forming jaws disposed adjacent to the overlapped portions of the strap in general alignment with said gripper longitudinally of the strap, the outer ends of said joint forming jaws and said gripper respectively forming two abutments spaced apart a distance of approximately 2.5 inches and cooperating to define a straight portion of the strap loop therebetween, and tensioning means for tensioning the loop of strap by withdrawing the supply portion thereof relative to the leading end thereof, said joint forming jaws having a first condition accommodating longitudinal movement of the supply portion of the strap by said tensioning means for tensioning the loop about the object and across said abutments, said joint forming jaws having a second condition for securing together the adjacent overlapping portions of the strap to provide a joint therebetween along the straight portion of the loop after tensioning thereof, the joint having a length less than the first dimension of the facing portion of the object for securing the strap in a tensioned condition about the object.

* * * * *